June 27, 1967  P. L. PETERSCHMIDT  3,327,874
BULK BLENDING AND BULK STORAGE PLANTS
Filed May 7, 1965  5 Sheets-Sheet 2
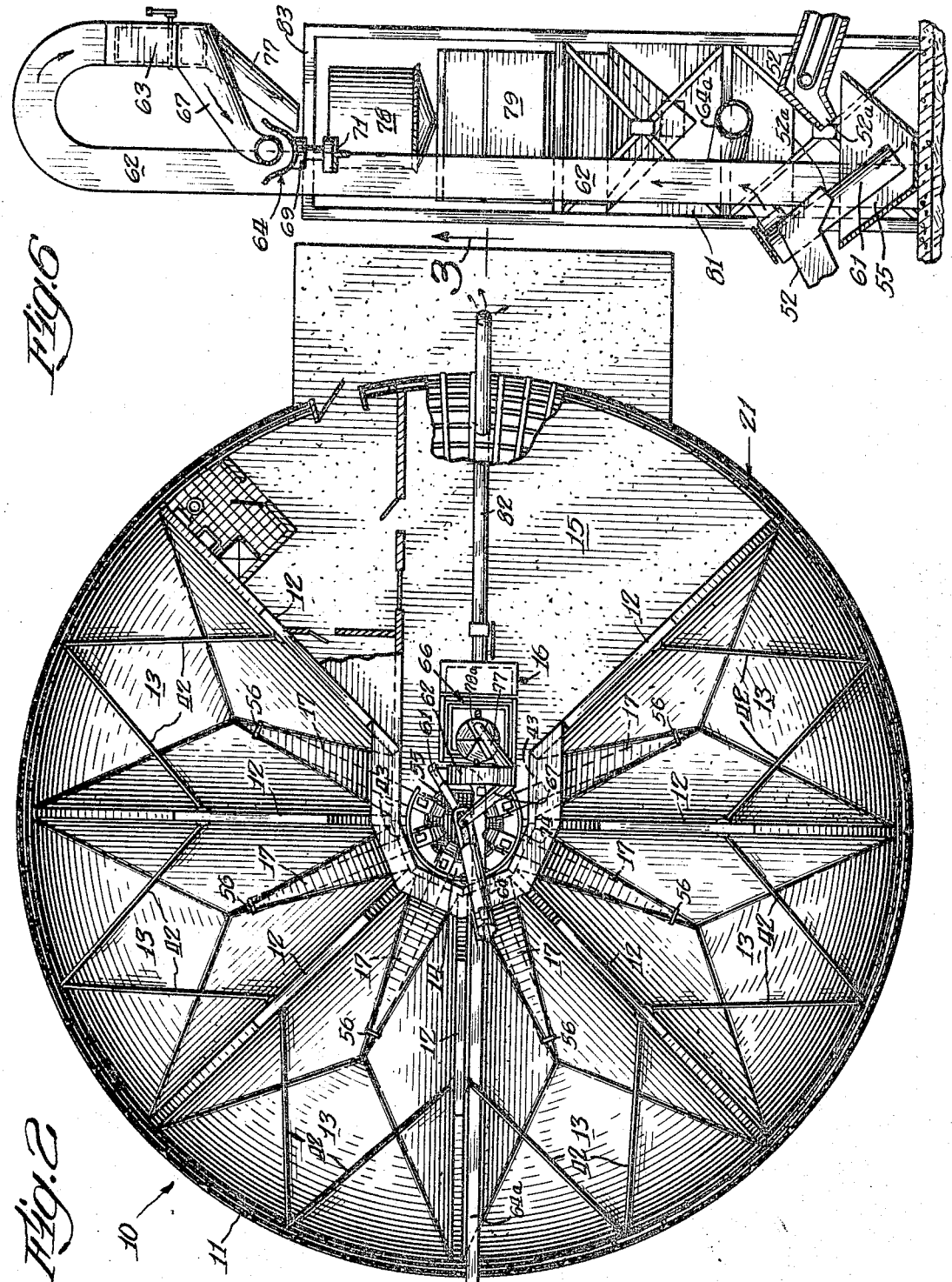
Inventor:
Paul L. Peterschmidt
By Hume, Groen, Clement & Hume, Attys

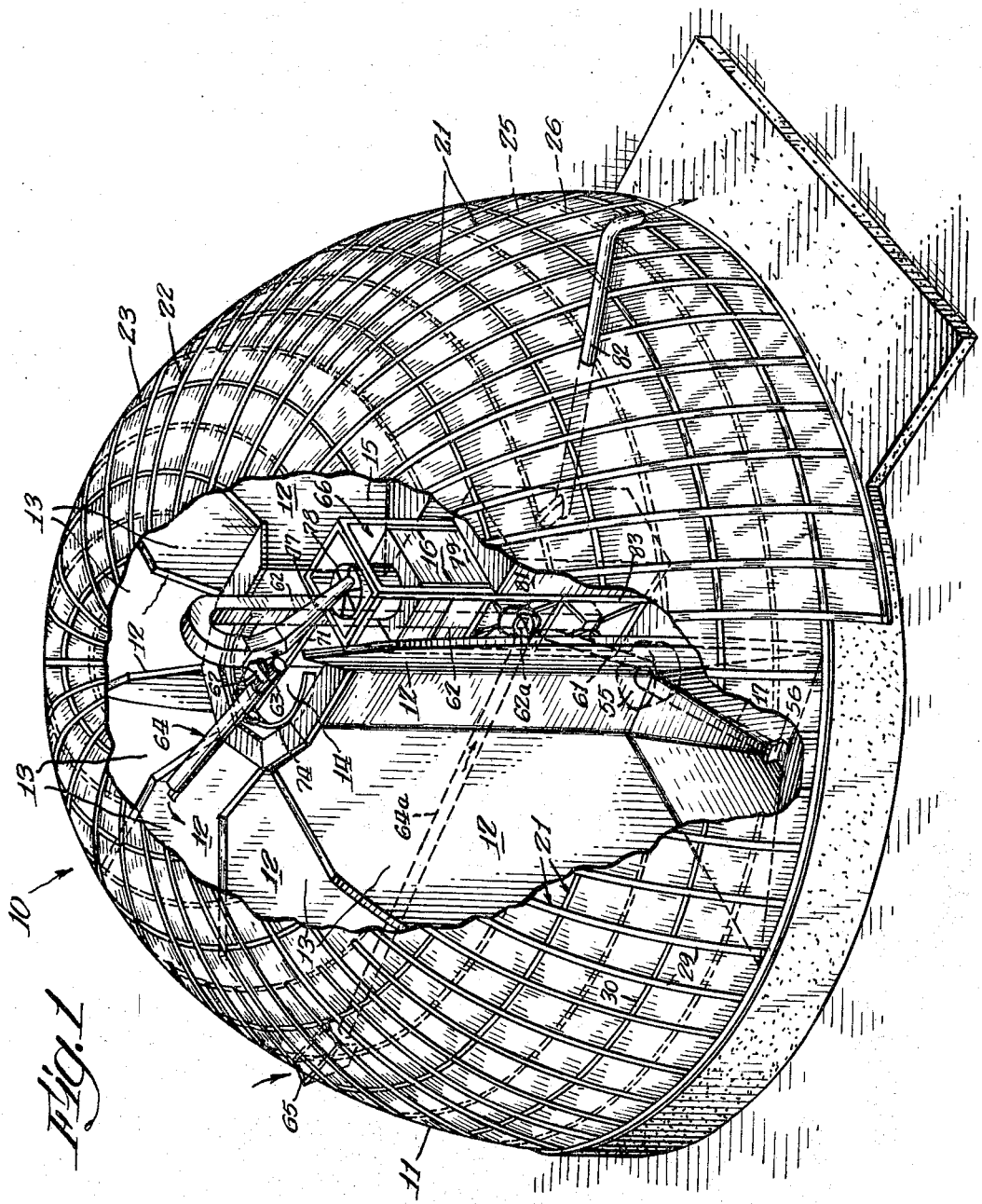

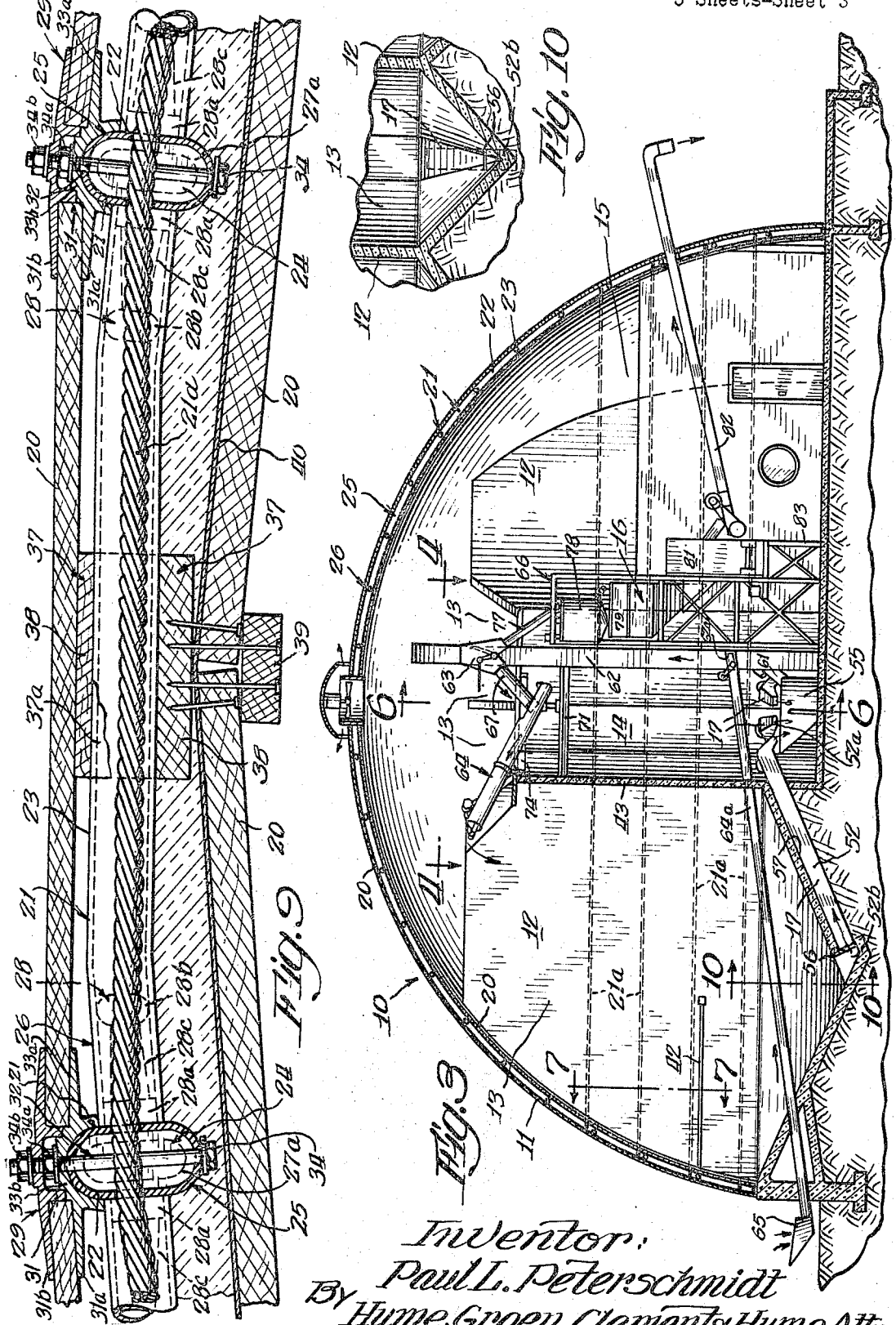

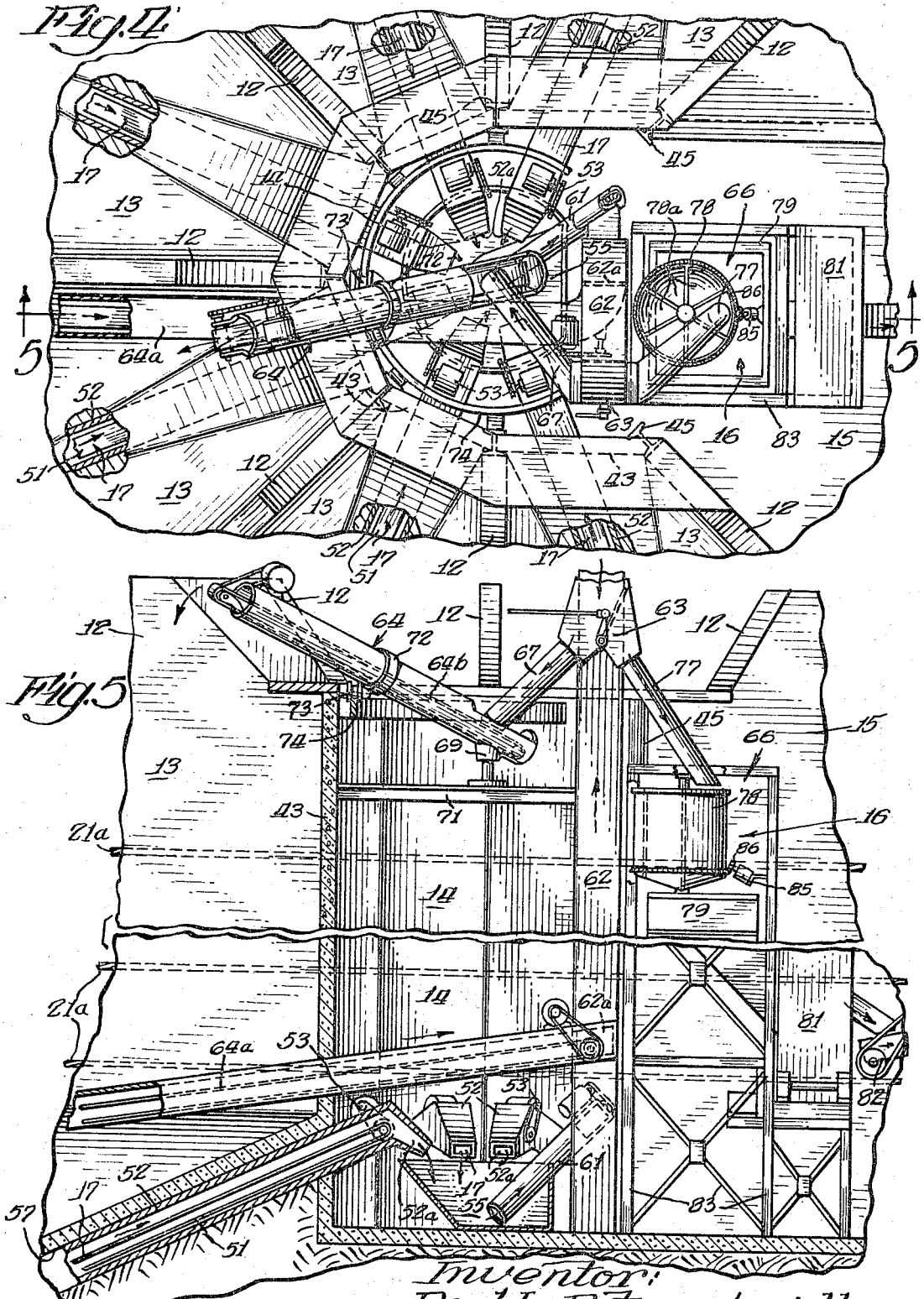

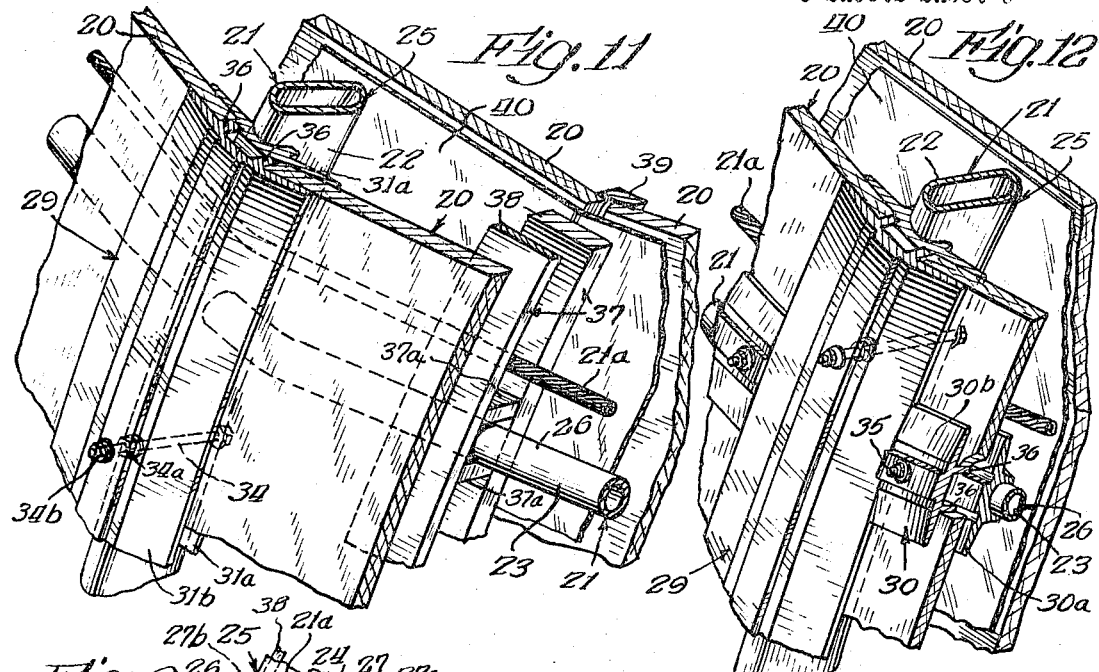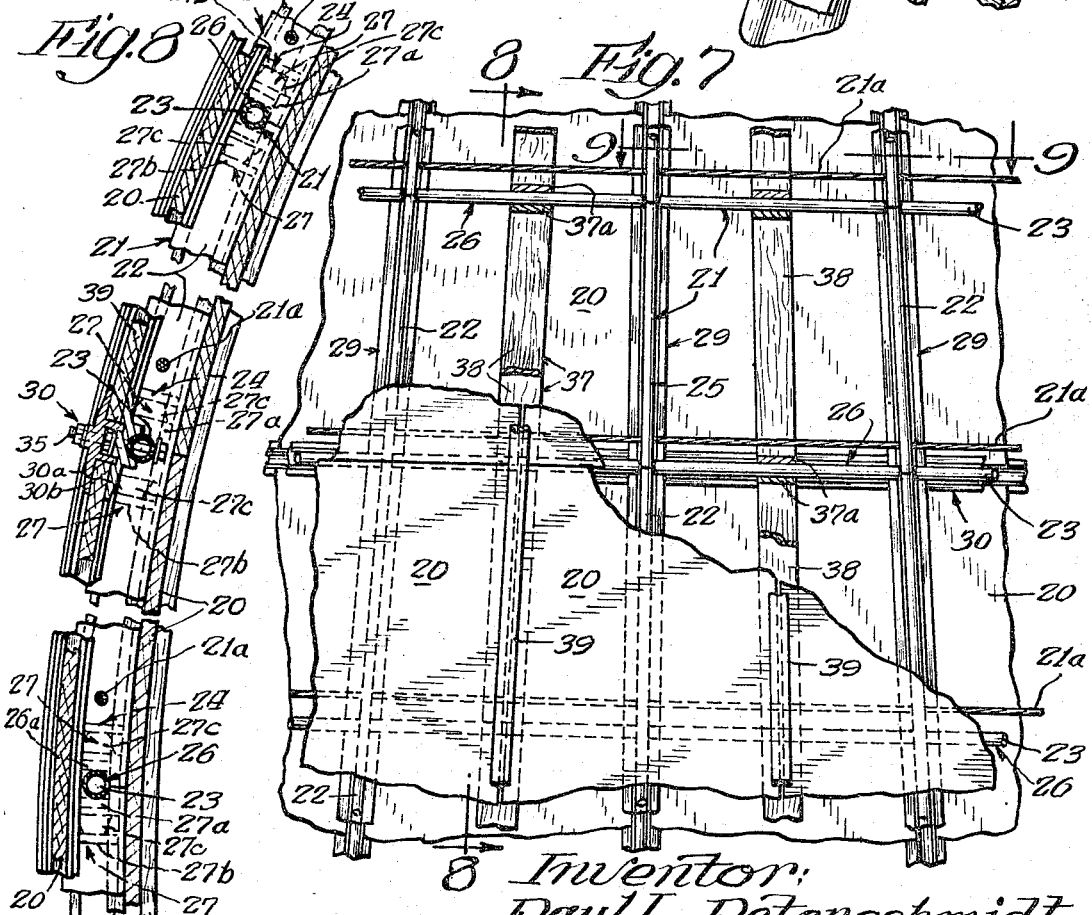

United States Patent Office 3,327,874
Patented June 27, 1967

3,327,874
BULK BLENDING AND BULK
STORAGE PLANTS
Paul L. Peterschmidt, Deerfield, Ill., assignor to Diversification Development Inc., Chicago, Ill., a corporation of Illinois
Filed May 7, 1965, Ser. No. 454,154
6 Claims. (Cl. 214—16)

This invention relates to bulk blending and bulk storage plants and more particularly to "paraspherically" shaped facilities wherein the blending of granular and other forms of materials is effected.

It is an object of the invention to provide an improved bulk blending facility.

Still another object of the invention is to provide a paraspherically shaped bulk blending and bulk storage plant wherein structural loading forces are minimized while at the same time storage volume is optimized.

An additional object of the present invention is to provide a bulk blending facility wherein the storage and selective mixing or blending of materials of various types can be reliably effected in a rapid and efficient manner.

A further object of the present invention is to provide a bulk blending and storage plant that is constructed of readily assembled, relatively low cost materials and wherein a maximum usable storage capacity is provided although the overall size of the plant is minimized.

Other objects and advantages of the present invention will become apparent from the following description of one preferred embodiment thereof particularly when considered in conjunction with the accompanying drawings wherein:

FIGURE 1 is a perspective view of an embodiment of a bulk blending facility constructed in accordance with the present invention and with a portion of the exterior wall thereof broken away to illustrate the interior construction of the facility;

FIGURE 2 is a horizontal cross sectional view of the embodiment of the facility depicted in FIGURE 1;

FIGURE 3 is a vertical cross sectional view taken along the line 3—3 in FIGURE 2;

FIGURE 4 is an enlarged fragmentary plane view taken along the line 4—4 in FIGURE 3;

FIGURE 5 is a fragmentary cross sectional view taken along the line 5—5 in FIGURE 4;

FIGURE 6 is an enlarged cross sectional view taken along the line 6—6 in FIGURE 3;

FIGURE 7 is an enlarged fragmentary view taken generally along the line 7—7 in FIGURE 3 and with portions broken away to illustrate the wall construction of the paraspheric dome;

FIGURE 8 is a fragmentary cross sectional view taken along the line 8—8 in FIGURE 7;

FIGURE 9 is an enlarged fragmentary cross sectional view taken along the line 9—9 in FIGURE 7;

FIGURE 10 is an enlarged cross sectional view taken along the line 10—10 in FIGURE 3;

FIGURE 11 is an enlarged fragmentary perspective view that depicts the wall construction of the facility; and FIGURE 12 is a view similar to FIGURE 11, but depicting another portion of the wall.

Referring generally to the drawings, the present invention is directed to an improved and preferably paraspherically shaped plant or facility capable of effecting the storage and selective bulk blending of materials (e.g. fertilizers, animal feed, and various other forms of powdered and/or granular materials). Preferably, the dome-like housing for the plant or facility is constructed in accordance with the invention disclosed and claimed in the co-pending application of the common assignee Serial No. 408,145 which was filed on November 2, 1964.

The dome-like plant or facility is provided with a plurality of inner wall members that define a plurality of individual bins. The bins are preferably laid out so that maximum usable storage capacity is attained with a minimum construction cost and with a minimum of structural loading on both the bin defining and exterior walls of the facility. The bin walls are further laid out so that a core section is provided. This core section is of sufficient height and offers sufficient area to accommodate equipment that is used to handle and/or selectively blend the material stored within the bins. In this latter connection, because of the "paraspherically" shaped or dome-like construction of the plant and the arrangement of the bin walls and bin floors, the material is stored in a condition which complements its natural angle or repose. Consequently "live" or vertical storage of the material is realized.

Although various means are suitable for use in effecting material handling and/or selective blending operations, it is preferable to employ a plurality of high speed belt conveyors, with one such belt conveyor being provided for each material accommodating bin. Preferably, the belt conveyors feed a central conveyor arrangement which, in turn, feeds a blending and distributing means located in the core section of the facility. The operation of the various conveyors is preferably reliably and automatically controlled from a control station within the facility.

Referring more specifically to FIGURES 1–3, the illustrated embodiment of the paraspherically shaped bulk blending facility is generally designated by the numeral 10. The facility 10 is depicted as including an outer paraspherically shaped dome or housing 11 which is internally partitioned by a plurality of bin defining walls or partitions 12 so as the define a number of individual bins or storage areas 13, a central core section 14 and a control or operating area 15.

The central core section 14 accommodates the various units which comprise the material handling and blending apparatus 16 for the facility 10. In the illustrated embodiment, the material handling and blending apparatus 16 is associated with individual material handling or conveyor units 17, one each of which is preferably provided for each bin or material storage area 13. In accordance with the present invention the individual conveyor units 17 are selectively rendered effective to provide desired amounts of material from selected ones of the bins or storage areas 13. These conveyor units 17, as dictated by a suitable control means (not shown), supply the material to the material handling and blending apparatus 16 in the central core section. Metered amounts of the material are then blended by the apparatus 16 and thereafter distributed from the facility 10 in a desired fashion. The material handling apparatus is also adapted to accommodate the "in-feed" of material to the various bins 13 so that various of the components of the apparatus 16 serve a dual "in-feed" and "out-feed" function.

Referring more specifically to the construction of the paraspherically shaped dome or housing 11, this structure, as generally outlined above, is preferably constructed in accordance with the invention disclosed and claimed in the aforementioned co-pending application Serial No. 408,145. In this connection, the dome or housing 11 preferably includes a fully load bearing a curvilinear framework 21. The framework 21 is formed by a plurality of tubular compression members 22 of a first cross sectional dimension and a plurality of tubular reinforcing members 23 of a second cross sectional dimension. A plurality of joint elements 24 are utilized to secure the reinforcing members to the compression members and thereby complete the framework 21. The framework 21 is adapted to receive a suitable enclosure means (e.g., in the form of a paneled covering, as shown or a poured concrete layer). The members 22 and 23 are preferably formed from aluminum, steel, magnesium, or other suitable high strength tubular material that is pre-cut and pre-formed to facilitate the rapid and efficient fabrication of the framework 21. That is, the members are preferably cut in preselected length and bent to complement the configuration of a given section of the framework. To enhance the strength and rigidity of these members for a given structural application, a flattened cylindrical, oval, or elliptic form of tubular material is employed, although round tubular components can also be utilized.

The framework is preferably formed by a plurality of joined, generally arcuate load-bearing columns 25 and reinforcing rings 26. The columns 25 and reinforcing rings 26 are constructed from a plurality of interconnected framework defining members 22 and 23 respectively. In this connection, the integral joining of the columns 25 to the rings 26 as well as the formulation of these components from the members 22 and 23 is preferably effected through the use of the joint elements 24.

As shown generally in FIGURES 8 and 9, each joint element 24 is formed with a base portion that is comprised essentially of the joined root segments 27a of a pair of pin members 27. Another pair of root segments 28a of a pair of pin members 28 extends from oppositely disposed surfaces of the base portion so that the pin members 27 and 28 are positioned at ninety degree angles one relative to the other.

The pin members 27 and 28 are shaped to slidably fit within the hollow ends of the tubular compression members 22 and reinforcing members 23, respectively. In this connection, the joint elements 24 are preferably generally similar to those disclosed and claimed in U.S. Patent No. 3,155,405 in that the root segments 27a and 28a of the pin members are joined to outer enlarged and rounded fitting portions 27b and 28b by intermediate portions 27c and 28c of reduced cross-section. However, the joint elements 24 preferably utilized in the framework structure 21 differ from those disclosed in this patent because the pin members 27 have somewhat of a "figure eight" configuration. That is, the maximum amount of the material utilized to form the pin members 27 is located in the plane of the maximum dimension and near the outermost edges of these members. Consequently, the pin members 27, which are designed to mate with the hollow ends of the compression members 22 in the formation of the load-bearing columns 25, are structurally comparable to an I-beam and have improved resistance to bending in one plane. To further enhance the structural stability of the framework particularly near the base portion thereof, a plurality of cable members 21a are secured to and strung between the load bearing columns and in spaced relation to each other as shown in FIGURES 7–10.

In FIGURES 7–9, 11 and 12, the inner and outer enclosure means for the framework structure 21 is also illustrated. The outer enclosure is shown as being comprised of a plurality of panel members 20, panel mounting accessories 29 and panel joining and sealing members 30. More particularly, this embodiment of the invention employs relatively thick, outer panel members 20 that are cut to correspond to the configuration of the open framework sections defined by the intersecting load-bearing columns 25 and reinforcing rings 26. Each of the outer panels 20 is secured to the framework 21 and joined in abutting relationship with the adjacent panels by means of the mounting accessories 29 and the joining and sealing members 30.

In this connection, the mounting accessories 29 each include a two-part mounting bracket 31 and suitable fastener means 32. The two-part mounting bracket 31 is formed by a lower elongated support plate 31a and an upper securing or cover plate 31b, between which the lateral edge portions of the outer panels 20 are positioned and secured as hereinafter described in detail. The support plate 31a has longitudinal edge portions 33a which are adapted to receive and support the outer panels 20 in anticipation of the joining of the panels to the framework. The longitudinal supporting edge portions 33a are separated by a slightly raised central portion 33b. The underside of each of the support plates 31a is formed with a concave or generally U-shaped configuration to complement the rounded exterior edge surface of the corresponding load bearing columns 25. It will be appreciated that once the support plates 31a are properly positioned on the edges of the columns 25, each such plate can be and is secured in place by means of fasteners 34 that pass through and extend beyond suitably apertured portions of both the compression members 22 and the plates. As shown, the fasteners 34 are preferably bolts having end portions threaded to receive both a first nut 34a for securing the support plates 31a to the compression members 22 and a second nut 34b for securing the cover plate 31b in its final position as hereinafter described.

In a similar manner, each of the joining and sealing members 30 is also a two-part unit including a lower support plate 30a and an upper securing or cover plate 30b. As with the plates 31a, the support plates 30a are proportioned to be joined to the reinforcing members 23, which comprise selected ones of the reinforcing rings 26, by fasteners 35.

In the illustrated embodiment, the lower support plates 31a are preferably joined to the columns 25 and reinforcing rings 26, respectively, during the fabrication of the framework structure 21. That is, these plates are laid in place on the appropriate surfaces of the columns 25 and selected ones of rings 26 in close abutting relationship and are secured in place by the fasteners 34 and 35. With this function completed, and either during the fabrication of the framework or after the framework has been completed, the outer panels 20 are located in place with the lateral, upper, and lower edge portions thereof being positioned on the supporting surfaces defined by the support plates 31a and 30a. Finally, the cover plates 31b and 30a are joined to the support plates so as to overlap the peripheral edges of the panels and maintain them in fixed relation with respect to the framework 21. Preferably, the support plates 31a are joined to the load-bearing columns 25 so that the completed brackets span the joints formed in these columns. In this way, the brackets serve the additional functions of locking the structure together and providing lift load protection. It should be understood that the panels 20 are preferably selected of a length such that joining and sealing members 30 need not be provided on each reinforcing ring, and the panels preferably span several rings located between those to which members 30 are joined.

As shown in FIGURES 8 and 12, each of the cover plates 31b and 30b is preferably constructed with a pair of spacers or projections 36 that extend inwardly therefrom and that are brought into abutting relationship with the lower support plates when the cover plates are in the final fixed position. More particularly, these inwardly extending projections 36 engage the central portion 33b of the corresponding support plate. With this type of mounting arrangement for the relatively thick panels 20, the positively fixed positioning of these panels on the framework structure 21 is assured.

Those skilled in the art will understand that the brackets 31 and sealing members 30 are preferably extruded or roll formed members formed of relatively low cost materials such as extruded aluminum, rolled steel or the like. Preferably, gaskets and other forms of sealing media (e.g. grouting) are used to effect sealing between the supported edge portions of the outer panels and the cover plates for the brackets and sealing members thereby insuring a leakproof structure.

As depicted in FIGURES 7–9, 11 and 12, the interior paneled enclosure is comprised of a plurality of vertically extending furring strip and spacer block assemblies 37 and inner panel members 20 that are supported by the assemblies 37 in spaced relation to the interior surface of the framework structure 21. The assemblies 37 include a plurality of pairs of spacer blocks 37a that are located on either side of each reinforcing member 23. These spacer blocks have the extremities thereof secured to furring strips 38 that are located on the interior and exterior sides of the framework 21 in parallel relation to the load-bearing columns 25.

Although a number of techniques may be employed in fabricating the interior paneled enclosure in conjunction with the aforedescribed outer enclosure, it is generally preferable to form the furring strip and spacer block assemblies 37 prior to the positioning of the outer panels 20. In this connection and considering one such assembly, the furring strip 38 that is designated to be the outer furring strip is preferably initially joined to the free ends of a plurality of spacer block pairs. These spacer blocks when joined to the furring strip 38 are suitably spaced so that the spacer blocks of each spacer block pair are located in vertically aligned relationship on opposite sides of selected ones of the reinforcing rings 26. That is, the spacer block-furring strip assemblies 37 are arranged to complement the positioning of the joining and sealing members 30, and the furring strips 38 are cut to terminate in proper mating relationship with these members.

After being so positioned, the assembly 37 is completed by joining the other furring strip 38 (i.e. the inner furring strip) to the various pairs of spacer blocks 37a (e.g. by nailing or stapling). When such assemblies 37 have been constructed for and joined to the entire framework structure 21, the interior panels 20 are secured in place as shown in FIGURE 10. Preferably, this is accomplished by nailing the edges of adjacent panels to the edges of the innermost furring strips 38 and an additional cover strip 39 is preferably utilized to mask and/or seal the gap between the adjacent edge portions of the inner panels. In addition, a moisture vapor barrier 40 is preferably provided on one surface of the panels 20 in the form of polyethylene sheets or the like (FIGURE 9).

Referring to the internal construction of the facility 10, the individual wall members or partitions 12 are preferably rigid, preformed (e.g. precast concrete) and suitably contoured partitions that are fabricated so that one side of each partition complements the curvilinear (i.e. "paraspheric") configuration of the dome or housing 11 as well as the floor surface of the facility in the bin or storage areas 13. In this latter connection, the floor surface of the facility is preferably of a poured concrete construction which has an inverted pyramidal configuration (FIGURE 3) in each bin or storage area 13, whereas in the control and core section of the facility the poured concrete floor has a horizontal configuration. As depicted in FIGURE 3, the concrete footing for the facility 10 and on which the framework 21 is mounted extends above the ground adjacent the bins or storage areas 13 so as to facilitate the rather unusual configuration of the bin floors without requiring a substantial excavating operation.

The wall members or partitions 12 are preferably secured to selected ones of the tubular compression members 22 by conventional fastening means (not shown) so that the inside of the facility is comprised of a plurality of adjacent bins or storage areas 13, each having similar floor configurations and dimensions so as to yield substantially equal volumetric capacities. The partitions 12 are further secured in fixed reinforced relation with respect to the housing 12 by elongated support brackets or cables 42 that are secured to extend between portions of the framework 21 and appropriate locations on the partitions themselves. In a conventional manner, the supporting cables 42 supply additional reinforcement for the partitions 12 so that these members readily withstand the forces that are normally imparted to the walls of the bins by the material confined therein. In this latter regard, it will be appreciated that a degree of self reinforcing of the partitions occurs when the adjacent bins are filled with corresponding amounts of material.

In addition to the side walls or partitions 12 (see FIGURES 2, 4 and 5), the bins are enclosed by end wall members 43 that preferably have a construction corresponding to that of the partitions 12. In this connection and as shown in FIGURE 4, the interior end portion of each of the partitions 12 is preferably secured or joined to an I-beam 45 that has the lowermost end thereof confined and supported within the concrete floor surface of the core section 14. The end walls 43 are preferably secured in a conventional manner between adjacent I-beams so that the structural stability of these members is insured while at the same time the bins or material storage areas are substantially "leak-tight."

In the embodiment of the invention depicted in the drawings, portions of the end walls 43 below the innermost edge of the inverted pyramidal floor surface of each of the bins 13 are suitably apertured to accommodate the passage of the conveyor units 17 therethrough. More specifically, each of the conveyor units 17 is preferably a high speed belt-type conveyor 51 that is confined within an enclosed tubular housing 52 and driven by a conventional, selectively operable motor drive means 53. The housing 52 preferably has an open discharge end 52a that is located in communication with a receiving hopper 55 which is, in turn, mounted on the floor of the core section 14 so that the open discharge end of each of the conveyors communicates with this receiving hopper.

As further illustrated in FIGURES 1, 3 and 5, the enclosed tubular housing 52 for each conveyor unit passes through a tunnel-like area formed beneath an inner slanted wall portion of the inverted pyramidal floor of the corresponding bins or storage area 13, and the oppositely disposed, open intake end 52b of the conveyor housing is aligned with a door or gate member 56. The gate member 56 is preferably selectively actuable to provide communication between the intake end of the conveyor unit and the bottom or "low point" of the floor of the bin or storage area with which the conveyor is utilized.

In accordance with the present invention and as hereinafter described in detail, the conveyor units 17 are selectively actuated so as to deliver material from the bin with which each is associated and selectively supply the material to the receiving hopper 55 in the core section 14. In this connection, the receiving hopper 55 constitutes one of several elements which make up the material handling and blending apparatus 16 for the facility 10. As shown in FIGURES 3–5, the apparatus 16 also preferably includes a belt type conveyor 61; an elevator 62; a selectively operable, material distributing valve member 63, which is associated with the elevator 62; an "in-feed" distributing mechanism 64; and a blending and "out-feed" mechanism 66.

The various components which comprise the material handling and blending apparatus 16, as generally outlined above, are preferably commercially available components which co-act to effect a desired blending operation as hereinafter more fully set forth. In this connection, the conveyor 61, conveyors 64a and 64b of the in-feed distributing mechanism 64 and the conveyor for the out-feed mechanism 66 are all preferably structurally and functionally similar to the conveyor units 17 employed in the bins or storage areas 13. That is, these various conveyor units are all preferably high speed, enclosed, belt type conveyors that are sold under the trademark "BeltVeyor" by Speed King Manufacturing Company, Inc., Dodge City, Kans. Preferably, these various conveyors are motor driven, with the operation of the motors being dictated in a conventional manner from an operator's control panel (not shown).

The elevator 62, which is also preferably of a commercially available type, functions to deliver the material supplied thereto through the material distributing valve member 63 to either the distributing mechanism 64 or the blending and out-feed mechanism 66. As shown in FIGURES 2–5, the first "in-feed" conveyor 64a is a relatively long conveyor unit that extends from the elevator 62, along one of the partitions 12, and through suitable sealed openings in the bin floor and footing for the housing 11. The end of the conveyor 64a that extends from the facility is preferably provided with a hopper input 65. However this hopper is selectively removable so that the otherwise open end of the enclosed conveyor 64a can be sealed when the conveyor is not in use. The other end of the first "in-feed" conveyor 64a is coupled directly to an input opening 62a in the housing of the elevator 62. In this connection, the enclosure for the conveyor 64a is supported at both ends and at suitably spaced locations along the partition 12 to insure the stability of this unit during "in-feed" operations.

Material is delivered to the elevator 62 from the first "in-feed" conveyor 64a when the selectively operable, material distributing valve member 63 is in the position illustrated in FIGURE 5. When the valve 63 is in this position, material discharged from the elevator 62 is fed through a stationarily mounted discharge tube 67 and into the open in-take end of the second "in-feed" conveyor 64b. As described with reference to the conveyor unit 17 and conveyor 64a, the conveyor 64b has the motor driven material distributing belt thereof confined within a tubular housing.

The housing of the conveyor 64b has the in-take end thereof pivotally supported on a bearing member 69 that is in turn secured to a mounting plate 71. The mounting plate 71 is suitably joined to and supported by the various end wall members 43 of the storage areas or bins 13. In addition, a collar or bracket member 72 is secured to the central portion of the tubular housing, and this collar or bracket serves as the mounting means for a driven wheel member 73. The wheel member 73 is in turn mated with and supported on an arcuate segment of track 74 which is in turn secured to and supported by a number of mounting brackets that extend from the end wall members 43.

With this mounting arrangement of the tubular housing for the conveyor 64b, the entire conveyor can be selectively advanced about the track so that the discharge end thereof is alignable with a selected bin 13. Preferably, the selective positioning of the conveyor 64b is effected by conventional motor drive means (not shown) that imparts rotary motion to the wheel member 73 so as to effect desired movement of the conveyor relative to the track 74.

As is apparent from the foregoing description, material supplied through the discharge tube 67 from the elevator 62 is fed to the conveyor 64b and, depending upon the selected position of this conveyor with respect to a given bin 13, the material is discharged thereto for storage. In this connection, the positioning of the conveyor 64b on the mounting plate 71 and with respect to the discharge tube 67, is such that the hopper can be selectively advanced to any position along the track 74 without disturbing the in-feed of material to the in-take end of this conveyor from the discharge tube 67.

The blending and out-feed mechanism 66 is in certain respects generally similar to the "in-feed" distributing mechanism 64. In this regard, the material distributing valve member 63 is positionable so as to provide direct communication between the elevator 62 and a stationarily mounted discharge tube 77. This discharge tube is preferably fixedly secured to the housing for the elevator 62 and is maintained in stationary relationship with the respect to the blending and "out-feed' mechanism 66. In this connection, the blending apparatus preferably includes a relatively low volumetric capacity surge hopper 78, a weigh hopper 79, a mixer 81 and an out-feed or discharge conveyor 82.

The small volumetric capacity surge hopper 78 is preferably either a multiple compartment tank structure (as shown) or a multi-compartment elongated trough-like unit. In either event, it is preferable that the hopper 78 be provided with a plurality of compartments 78a and be selectively positionable so as to align any given one of the compartments 78a with the discharge tube 77. In addition, the individual compartments 78a which comprise the hopper 78 are preferably provided with a normally open discharge port that can be closed and maintained in a closed position in response to the actuation of a suitable valve member (not shown) or the like.

When in the normally open position, the discharge port of the compartment aligned with the discharge tube 77 provides direct communication between the discharge tube and the weigh hopper 79 which, in accordance with the invention, is one of several conventional and commercially available types. The weigh hoper 79 is, in turn, constructed to selectively deliver material directly to the mixer 81 and, if desired, might be designed to effect pre-mixing of the material. In a conventional manner, the surge hopper 78, weigh hopper 79 and the mixer 81 are all mounted on a supporting structure 83 that is formed from a plurality of reinforced and structurally stable beams, supporting plates, cross bar members and the like.

The operation of the blending apparatus is carried out in response to the delivery of material from various of the bins 13 through the elevator 62 and the discharge tube 77. In this connection, it is typical and preferable to carry out blending operations and the mixing of various materials on the basis of weight percentages. Accordingly and assuming that one desires to yield a given amount of a preselected formula of fertilizer comprised of three constituents stored in three separate bins 13 within the facility 10, these materials are individually distributed to the hopper 55 by the conveyor units 17 associated with the bins in which the materials are stored. In anticipation of the delivery of the first of the materials via the elevator 62, the surge hopper 78 is selectively positioned under the control of the conventional motor drive arrangement 85 so that one of the several compartments 78a of this hopper is aligned with the discharge tube 77.

At this time, the discharge port of the aligned compartment 78a is open to provide direct communication between the discharge tube and the weigh hopper 79. Preferably, the motor drive arrangement 85 operates through a conventional gearing arrangement 86 to effect the controlled positioning of the surge hopper 78.

As the desired amount of material is supplied from one of the bins 13 and through the various conveying means as outlined above, the weigh hopper 79 senses the accumulation of this material therein. In view of the high speed operation of these various components, the desired weight of the material is supplied to the weigh hopper in a relatively short duration of time. When the weigh hopper senses the accumulation of an amount (i.e. a preselected light weight) of material just under the desired final weight of this material component of the final mixture, a control means is actuated to terminate the delivery of the material from the bin in which it is stored.

The material in transit through the various conveying means at this time nevertheless continues to advance toward the weigh hopper. As substantially the desired final weight is sensed by the weigh hopper, the control means actuates the valve member associated with the surge hopper discharge port so as to block any further passage of material through the compartment 78a of this hopper which is then aligned with the discharge tube 77. Consequently, a portion of the material still in the delivery process is accumulated in the then closed compartment 78a.

Obviously, the capacity of the individual compartments 78a of the surge hoper 78 is selected so as to readily accommodate any such material that is in transit in the conveyor and elevator system after the control means is actuated as set forth above. This material is retained in the surge hopper compartment until another quantity of the same material is needed, at which time this accumulated amount is discharged into the weigh hopper after the proper positioning of the surge hopper and the return of the discharge port of the compartment to the normally open condition.

After the accumulation of the desired weight of the one material component within the weigh hopper, this material is distributed to the mixer 81. Similar operating cycles are repeated for the other two component materials necessary to make up the desired final composition. After all of these materials have been fed to the mixer 81 and suitably blended therein, the mixer is actuated to supply the material to the high speed discharge conveyor 82 at which time it is selectively discharged from the facility.

From the foregoing, it will be appreciated that the present invention provides an improved dome-shaped facility for effecting the storage and/or selective bulk blending of materials. The facility is characterized by a plurality of storage bins that extend radially from a core section formed in the central-most portion of the facility by the various bin defining walls. This structural arrangement not only facilitates the highly efficient handling of materials but also yields maximum usable storage capacity while at the same time minimizing the overall size of the facility. Moreover, the construction is such that the materials are stored in a condition which complements their natural angle of repose so that structural loading forces are minimized.

It will be apparent that various modifications of the disclosed facility can be readily effected without departing from the invention. For example, an upper flooring surface can be fabricated over the tops of the bins or storage areas as well as the remaining portion of the facility so as to yield additional storage and/or working area. In addition, rather than employ the automated material handling equipment as described in conjunction with the illustrated embodiment, the end walls of the bins can be constructed to allow access from the central core section by various forms of mechanical material handling devices. As a further alternative, the individual conveyor units might be replaced by a single selectively positionable conveyor located in the storage and work area defined by the upper flooring surface previously referred to. In this instance, the single conveyor unit is preferably positioned with respect to a given bin or storage area and advanced into a material removing position through appropriate ports in the upper flooring.

The foregoing and other changes in and/or modifications of the facility (e.g. a less sophisticated form of construction for the paraspherically shaped enclosure) might be devised by those skilled in the art without departing from the invention, various features of which are set forth in the accompanying claims.

What is claimed is:

1. A storage and bulk blending facility which comprises an outer dome-like enclosure, a plurality of first wall member mounted within said enclosure and disposed substantially radially with respect to said enclosure so as to define a plurality of adjacent storage bins having outer walls defined by said dome-like enclosure, second wall members defining a central core section common to said bins and from which said bins radially extend, and means communicating with said storage bins so as to facilitate the selective handling of materials confined therein.

2. A storage and bulk blending facility which comprises an outer dome-like enclosure, a plurality of first wall members mounted substantially radially within said enclosure so as to define a plurality of adjacent storage bins having outer walls defined by said dome-like enclosure, means providing an inverted pyramidal floor configuration for each of said bins, second wall members defining a central core section common to said bins and from which said bins radially extend, and means communicating with said inverted pyramidal floor configurations of said storage bins from said core section so as to facilitate the selective handling of materials confined within said bins.

3. A storage and bulk blending facility which comprises a paraspherically shaped enclosure, a plurality of first wall members mounted within said enclosure so as to define a plurality of storage bins having outer walls defined by said paraspherical enclosure, each of said storage bins having an inverted pyramidal floor configuration, a plurality of second wall members joined to said first wall members so as to complete the enclosure of said storage bins and define a central core section common to said bins, means mounted within said core section for handling material derived from said bins, and conveyor means communicating with said storage bins and said central core section so as to accommodate the selective distribution of material from said storage bins to said material handling means.

4. A storage and bulk blending facility which comprises a paraspherically shaped enclosure, a plurality of first wall members mounted substantially radially within said enclosure so as to define a plurality of adjacent storage bins having outer walls defined by said paraspherical enclosure, each of said storage bins having an inverted pyramidal floor configuration, means joining said first wall members to said enclosure so as to effect the reinforcement of said wall members, a plurality of second wall members joined to said first wall members so as to complete the enclosure of said storage bins and define a central core section common to said bins and from which said bins radially extend, means mounted within said core section for handling material derived from said storage bins, and conveyor means extending between and communicating with the lowermost portion of each of said pyramidally shaped bin floors and said central core section so as to accommodate the selective distribution of material from said storage bins to said material handling means.

5. A storage and bulk blending facility which comprises a paraspherically shaped enclosure, said enclosure being defined by a structural framework formed of a plurality of prefabricated framework elements and a plurality of prefabricated panel members removably joined to said framework elements, a plurality of first wall members mounted within and joined to said enclosure so as to define a plurality of adjacent storage bins having outer walls defined by said paraspherical enclosure, each of said storage bins having an inverted pyramidal floor configuration, a plurality of second wall members joined to said first wall members so as to complete the enclosure of said storage bins and define a central core section common to said bins and from which said bins radially extend, and means communicating with said storage bins so as to facilitate the selective handling of material confined therein.

6. A storage and bulk blending facility which comprises a partially elevated flooring surface, a paraspherically shaped enclosure mounted on said flooring surface, said enclosure being defined by a structural framework formed of a plurality of prefabricated framework elements and a plurality of prefabricated panel members removably joined to said framework elements, a plurality of first wall members mounted within and joined to said enclosure so as to define a plurality of adjacent storage bins having outer walls defined by said paraspherical enclosure, the portion of said flooring surface for each of said bins being formed with an inverted pyramidal floor configuration, means joining said first wall members to said enclosure so as to effect the reinforcement of said wall members, a plurality of second wall members joined to said first wall members so as to complete the enclosure of said storage bins and define a central core section common to said bins and from which said bins radially extend, means mounted within said core sction for handling material derived from said storage bins, and conveyor means extending between and communicating with the lowermost portion of each of said pyramidally shaped bin floors and said central core section so as to accommodate the selective distribution of material from storage bins to said material handling means.

References Cited
UNITED STATES PATENTS

| | | | |
|---|---|---|---|
| 2,278,956 | 4/1942 | Wagner | 52—81 |
| 2,587,854 | 3/1952 | Johnson | 214—16 |
| 3,197,044 | 7/1965 | Hozak | 214—16 |

GERALD M. FORLENZA, *Primary Examiner.*

ROBERT G. SHERIDAN, *Examiner.*